(12) United States Patent
Hoffmann

(10) Patent No.: US 9,578,680 B2
(45) Date of Patent: Feb. 21, 2017

(54) WIRELESS COMMUNICATION DEVICE USING MULTIPLE MODEMS

(71) Applicant: The Boeing Company, Chicago, IL (US)

(72) Inventor: Ceilidh Hoffmann, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 157 days.

(21) Appl. No.: 13/867,451

(22) Filed: Apr. 22, 2013

(65) Prior Publication Data

US 2014/0269310 A1 Sep. 18, 2014

Related U.S. Application Data

(60) Provisional application No. 61/794,679, filed on Mar. 15, 2013.

(51) Int. Cl.
*H04W 84/18* (2009.01)
*H04W 28/02* (2009.01)

(52) U.S. Cl.
CPC ............ *H04W 84/18* (2013.01); *H04W 28/021* (2013.01)

(58) Field of Classification Search
None
See application file for complete search history.

(56) References Cited

U.S. PATENT DOCUMENTS

| | | | |
|---|---|---|---|
| 7,773,558 B2* | 8/2010 | Cho et al. | 370/329 |
| 8,068,454 B2* | 11/2011 | Bonta et al. | 370/329 |
| 8,824,442 B2* | 9/2014 | Lea et al. | 370/338 |
| 2004/0052273 A1* | 3/2004 | Karaoguz et al. | 370/465 |
| 2007/0239229 A1 | 10/2007 | Masoud et al. | |
| 2007/0263710 A1 | 11/2007 | Kasslin et al. | |
| 2008/0137556 A1* | 6/2008 | Park | H04L 29/12264 370/255 |
| 2011/0292844 A1 | 12/2011 | Kwun | |
| 2012/0147868 A1* | 6/2012 | Williams et al. | 370/338 |
| 2012/0169550 A1 | 7/2012 | Schlub et al. | |
| 2014/0112242 A1* | 4/2014 | Vilmur et al. | 370/327 |

OTHER PUBLICATIONS

Great Britain Application No. 1402586.0; Combined Search and Examination Report; dated Jun. 2, 2014; 5 pages.

* cited by examiner

*Primary Examiner* — Hassan Phillips
*Assistant Examiner* — Saba Tsegaye
(74) *Attorney, Agent, or Firm* — Baker & Hostetler LLP

(57) ABSTRACT

A mobile communications device allows communication in an ad hoc wireless network. The mobile communications device transmits, on a first radio frequency (RF) channel of the wireless network, a first signal by at least a first radio of the wireless device, the first signal encoded using at least a first modem of the wireless device. The mobile communications device concurrently transmits or receives, on an RF second channel of the wireless network, a second signal by at least a second radio of the wireless device, the second signal encoded or decoded using at least a second modem of the wireless device.

20 Claims, 10 Drawing Sheets

WIRELESS COMMUNICATION DEVICE USING MULTIPLE MODEMS

CROSS REFERENCE TO RELATED APPLICATIONS

This application claims benefit under 35 U.S.C. §119(e) of Provisional U.S. Patent Application No. 61/794,679, filed Mar. 15, 2013, the contents of which are incorporated herein by reference.

FIELD

The present disclosure relates generally to wireless communication, and more particularly to communication in a wireless network among a plurality of radios.

BACKGROUND

In a mesh network, each node sends and receives its own data and relays data for other nodes connected to the mesh network. In such a network, a data packet may be propagated from node to node until the destination is reached. The mesh network may change configuration as nodes are added to the mesh network or removed from the mesh network. In a wireless mesh network, the nodes may include mobile computing devices such as laptops and smart phones. The nodes may include radios for wireless transmission/reception with peer nodes. In addition to mobile computing devices, a wireless mesh network may also include routers and gateways. Wireless mesh networks can be implemented with a number of wireless technologies including 802.11, 802.16, and cellular technologies.

A mesh network can also be an ad hoc network. An ad hoc network does not require a preexisting infrastructure and may be formed on the fly when two or more wireless devices come within communication range of each other. Nodes may associate with any other node in the ad hoc network. Furthermore, nodes in an ad hoc network may route and forward data intended for other nodes.

In a mesh and/or ad hoc network, conventional wireless radios may communicate in either a half-duplex mode or a full-duplex mode. In the half-duplex mode, a single radio channel may be used to transmit data from a first radio to a second radio during a first time period. The same radio channel may be used to transmit data from the second radio to the first radio during a second period of time that does not overlap with the first period of time. That is, in the half-duplex mode, the first communication device and the second communication device cannot transmit and receive simultaneously. In the full-duplex mode, a first channel may be used for transmission of data from a first radio to a second radio, and a second channel may be used for transmission of data from the second radio to the first radio.

SUMMARY

Illustrative embodiments of the present invention include, without limitation, a method, system, and computer readable storage medium. In one aspect, a method for communicating in an ad hoc wireless network by a wireless device is provided. On a first radio frequency (RF) channel of the wireless network, a first signal is transmitted by at least a first radio of the wireless device. The first signal may be encoded using at least a first modem of the wireless device. On a second RF channel of the wireless network, a second signal may be concurrently received by at least a second radio of the wireless device. The second signal may be encoded or decoded using at least a second modem of the wireless device. On a third RF channel of the wireless network, a third signal may be concurrently received or transmitted by at least a third radio of the wireless device. The third signal may be encoded or decoded using at least a third modem of the wireless device.

In another aspect, a mobile communications device configured to communicate in a peer-to-peer wireless network is provided. A first radio may be configured to transmit or receive over at least a first channel in the peer-to-peer wireless network. A second radio may be configured to transmit or receive over at least a second channel in the peer-to-peer wireless network. The mobile communications device may be configured to transmit or receive, via the first radio, a first signal on the first channel. The mobile communications device may be further configured to concurrently transmit or receive, via the second radio, a second signal on the second channel.

In another aspect, a non-transitory computer-readable storage device is provided. The non-transitory computer-readable storage device has computer-executable instructions embodied thereon for communicating in an ad hoc wireless network by a wireless device. A first signal on a first channel of a wireless communication network may be received via a first modem of a mobile computing device. A second signal on a second channel of the wireless communication network may be concurrently received via a second modem of the mobile computing device.

Other features of the inventive system and method are described below. The features, functions, and advantages can be achieved independently in various embodiments or may be combined in yet other embodiments, further details of which can be seen with reference to the following description and drawings.

BRIEF DESCRIPTION OF DRAWINGS

Embodiments of techniques in accordance with the present disclosure are described in detail below with reference to the following illustrations.

DETAILED DESCRIPTION

The conventional design of a two-way radio communication device—satellite, terrestrial cellular, long-haul microwave, near field communication, personal wireless (e.g. Bluetooth®), for example—typically provides for two separate communication links or channels: one link or channel for the forward communication link or channel ("a" to "b") and another link or channel for the reverse communication link or channel ("b" to "a"). If these two links or channels occupy the same radio frequency (RF) spectrum, for example 2,410 MHz to 2,430 MHz but time-share their forward and reverse links or channels, the method of communication can be said to be "half-duplex." On the other hand, if two different RF spectra are used for forward and reverse communication links or channels respectively, the method of communication can be said to be "full-duplex."

In wide-area cellular radio and local-area WiFi networks, the forward channel is typically used for communication from the base station/access point to the end user wireless device. The forward channel is also commonly referred to as the "downlink." The reverse channel from the end-user wireless device to the base station/access point is typically known as the "uplink."

Figure 1:
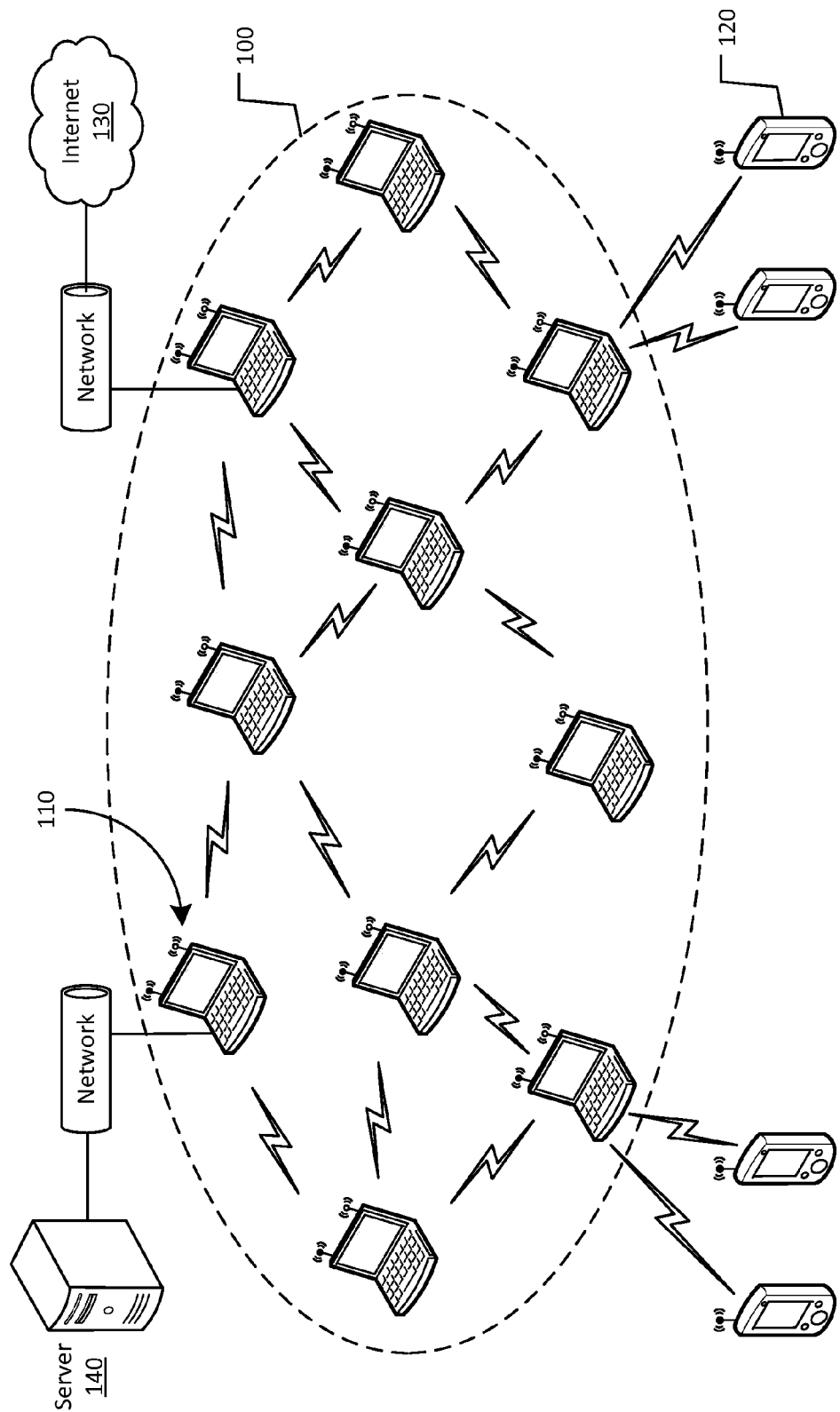
FIG. 1 depicts an example of a wireless mesh network.

FIG. 1 depicts an example of a wireless mesh network 100. The wireless mesh network 100 may include a number of wireless devices or nodes 110. The wireless devices or nodes 110 may be communicatively coupled or peered with other wireless devices or nodes 110 in the wireless mesh network 100. As shown, some of the wireless devices or nodes 110 may be peered with more than one other of the wireless devices or nodes 110. A wireless device or node 110 that is peered with another wireless device or node 110 may be referred to as a peer wireless device or node or a peered wireless device or node. Some of the wireless devices or nodes 110 may further be communicatively coupled to local devices 120 that are not peered to other wireless devices or nodes 110 and may only be accessible by the coupled wireless device or node. One or more of the wireless devices or nodes 110 may further be communicatively coupled to another network such as the Internet 130. One or more of the wireless devices or nodes 110 may further be communicatively coupled to other computing devices such as server 140. Each of the wireless devices or nodes 110 may send and receive data as well as relay data for others of the wireless devices or nodes 110 connected to the wireless mesh network 100. The wireless mesh network 100 may dynamically change configuration as nodes are added or removed. The wireless mesh network 100 can be implemented with any number of wireless technologies, such as IEEE 802.11 or ZigBee, or the like.

Figure 2:
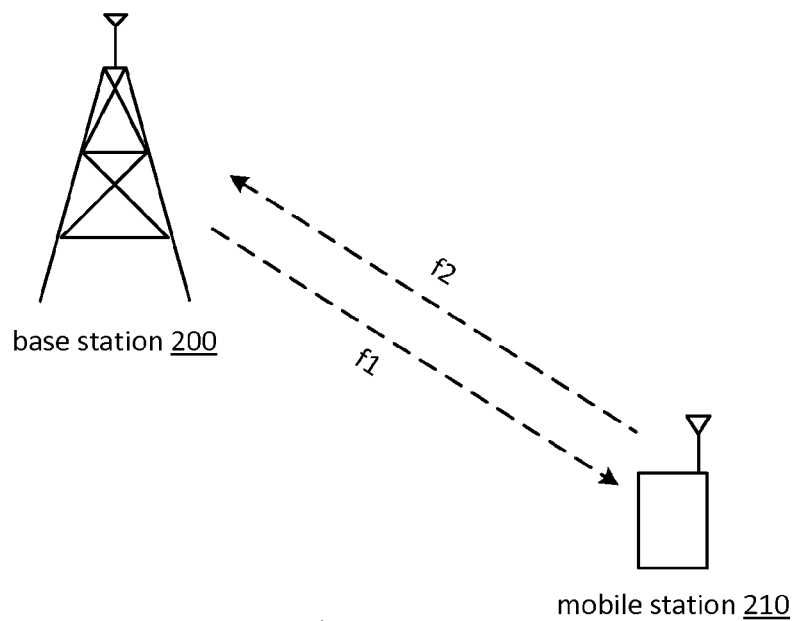
FIG. 2 depicts an example of full-duplex communication.

FIG. 2 depicts an example of full-duplex communication between base station 200 and mobile station 210 where two different radio frequency channels (f1 and f2) are used simultaneously, one for transmission and another for reception at each station. In FIG. 1, each dotted line indicates a communication link of a specific radio frequency channel with an arrow designating the direction of signal transmission. As shown in FIG. 2, channel f1 is used to send user information from base station 200 to mobile station 210. Likewise, channel f2 is used to send user information from mobile station 210 to base station 200.

Figure 3:
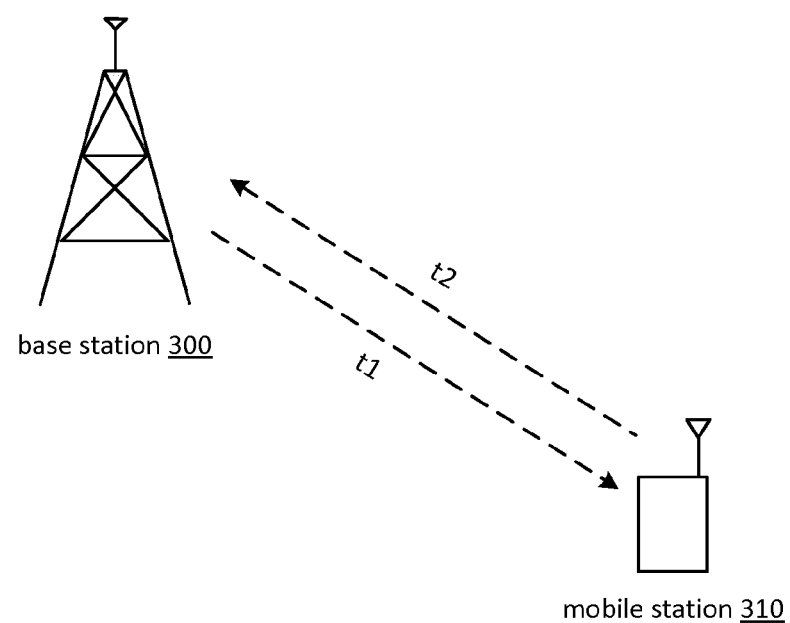
FIG. 3 depicts two radios in a half-duplex mode.

In the half-duplex mode, only one of these two links is active at any time. FIG. 3 depicts two radios in a half-duplex mode with transmit and receive functions occurring in two non-overlapping time intervals. Time interval t1 is used to send user information from base station 300 to mobile station 310, while time interval t2 is used to send user information from mobile station 310 to base station 300. Time intervals t1 and t2 are non-overlapping. In FIG. 3, two non-overlapping time intervals t1 and t2 are used—one for transmission and another for reception at each station.

Conventional mesh networks typically employ half-duplex communications. As shown in FIG. 1, the nodes in the wireless mesh network 100 share the same spectrum. When one node is transmitted, other nodes must listen. Because of this constraint, it is not possible for such a network to implement full-duplex communications. For example, the transmitting node does not listen while transmitting since there are no other transmitters to listen to except for itself.

Despite the popularity of cellular telephone networks and local area WiFi networks in public and residential environments, there has been continued interest in peer-to-peer or wireless ad hoc mesh communication networking in which communications do not depend on, for example, WiFi access points or cellular base stations for message relaying. Many entities may benefit from the ability to quickly set up and operate such mesh networks, for example, in disaster areas that have lost electricity and/or wherein the communication infrastructure has been damaged. Furthermore, with continued growth in the implementation of military and commercial wireless networks, methods that can support greater amounts of data sharing are desirable. Current designs for data sharing via infrastructure backbones can lead to single points of failures or bottlenecks. Furthermore, greater distributed data sharing requires that the underlying networks can scale (i.e., support high data rates while keeping overhead costs low as network size grows).

Unlike cellular or WiFi networks, in a wireless ad hoc mesh network the concept of forward and reverse channels or uplink and downlink is not directly applicable. The wireless devices in an ad hoc mesh network are "peers;" e.g., the wireless devices may have similar communication and networking characteristics without the need for a controlling base station or a master wireless device. When a wireless device transmits, every other wireless device within radio range may listen. To increase effective communication among the wireless devices, the wireless devices may lock on to the same RF spectrum for signal reception and time-share their transmission opportunities.

One limitation of conventional wireless ad hoc networking is that the wireless devices receive signals on a single RF communication channel. This limitation is due to the use of a single receiver modem in the wireless devices. A modem (modulator-demodulator), as used herein, may be a device that modulates an analog carrier signal to encode digital information and demodulates a carrier signal to decode transmitted information. In conventional two-way radio communications used in technology areas such as satellite, terrestrial cellular, long-haul microwave, near field communication, and personal wireless (e.g. Bluetooth®), etc., two separate communication links or channels are typically used—one for the forward link or channel ("a" to "b") and another for the reverse link or channel ("b" to "a"). Bluetooth® uses a single channel. In fact both WiFi and Bluetooth operate in the same RF 2.4 GHz band. Cellular and satellite networks typically use two different channels for the uplink and downlink. As discussed above, wireless devices may operate in a half-duplex mode, or if two different RF spectra are used for forward and reverse communications respectively, the full-duplex mode may be used. The limitation of having a single downlink channel may be analogized to a human being's ability to decipher one speech at a time. If two people are speaking at the same sound level, it is difficult or impossible to decipher what each person is saying simultaneously. This may be referred to as the "mutual interference" effect.

In various embodiments described herein, greater scalability may be achieved in wireless ad hoc mesh networks.

In the present disclosure, methods and systems for improving wireless communications capabilities over conventional full-duplex communication are described. In one embodiment, a wireless communication device is described that can transmit and receive simultaneously using more than two channels, where multiple communication channels may be used to multiplex information messages. The disclosed wireless communication device may support simultaneous transmission and reception capability by using two or more modems (or transceivers) in parallel. The number of transmitters "T" and the number of receivers "R" in the device is not limited and can be arbitrary.

Figure 4:
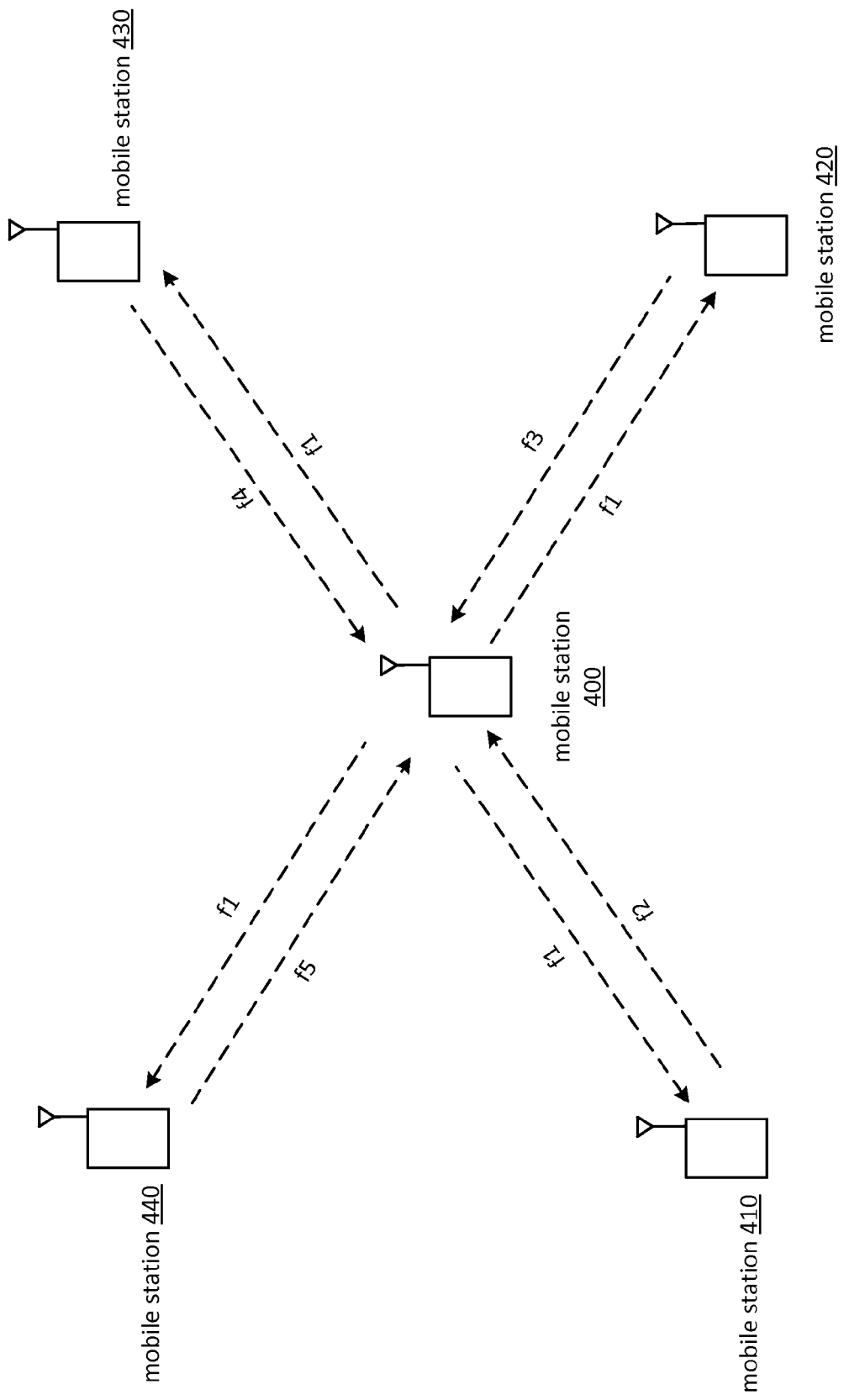
FIG. 4 depicts one embodiment of multi-channel full-duplex communication.

FIG. 4 depicts one embodiment of multi-channel full-duplex communication among five mobile stations in accordance with the disclosure. Referring to the example in FIG. 4, a mobile station 400 may be equipped with one transmitter (not shown) and four receivers (not shown). While the mobile station 400 is transmitting messages to mobile stations 410, 420, 430, and 440 using channel f1, the mobile station 400 is concurrently receiving messages from the mobile stations 410, 420, 430, and 440 on channels f2, f3, f4, and f5, respectively. For clarity, FIG. 4 illustrates the multi-channel full-duplex communication capability of mobile station 400 although the capability is applicable to any of the other mobile stations in FIG. 4. Mobile station 400 is shown receiving signals using four different radio frequency channels (f2, f3, f4, and f5) while transmitting on radio frequency channel f1. In one embodiment, the reception on channels f2, f3, f4, and f5 and transmission on f1 can occur simultaneously. In general the multi-channel full-duplex capability allows mobile station 400 to transmit at more than one radio frequency channel.

A wireless device with multi-channel full-duplex capability, when operating as a peer node in a wireless ad hoc network, may also time-share transmission opportunities with its peers as well as relay and forward other peers' information messages (e.g., routing and forwarding). In one embodiment, a device with multi-channel full-duplex capability may run a single protocol stack for networking and communication and use multiple RF communication channels for simultaneous message transmission and reception. A protocol stack may generally refer to an implementation of a computer networking protocol suite. To facilitate multiplexing of information messages from multiple modems or transceivers, in one embodiment a device with multi-channel full-duplex capability may include a data frame processor and multiplexer as described above. In one embodiment, the data frame processor and multiplexer may comprise a local area network switch. A network switch may be any computer networking device that links network segments or network devices. For example, a network switch may be implemented as a multi-port network bridge that processes and routes data at the data link layer and/or the network layer.

Some conventional wireless devices may implement multi-channel radios that implement a different waveform type for each channel. For example, such a conventional device may implement Single Channel Ground and Airborne Radio System (SINCGARS) on channel 1 and Soldier Radio Waveform (SRW) on channel 2. The present disclosure describes the use of multiple channels running one type of waveform. By contrast, using single-channel communication, the network may be unable to support both voice and data because of trade-offs between throughput and network delay. Scalability may be limited to less than 100 radios per network, and end-to-end delay may accumulate as the size of the network grows.

Multiple-input, multiple-output (MIMO) devices typically use two or more antennas for transmission, reception, or both to improve the reception quality of the received signal. This improvement in signal quality may translate to a higher quality of service (e.g., voice quality, data connectivity, or signal range) or a higher information rate. Although multiple antennas are used, the antennas transmit and receive on the same single RF spectrum. A multi-channel full-duplex capability radio in accordance with the disclosure uses at least two non-overlapping RF spectra for simultaneous transmission and/or reception.

A frequency diversity radio may use two or more RF channels to improve the quality of signal reception. Unlike a wireless device with multi-channel full-duplex capability, the main purpose of a frequency diversity radio is to improve signal quality; hence, the same information message is sent on two different RF channels. At the receiving end, the received signals are combined using a predefined algorithm to reconstitute the original single information message. In contrast, a wireless device with multi-channel full-duplex capability in accordance with the disclosure uses two or more RF channels to convey independent information message streams. One message stream may use channel f1 targeted for receiver M and another message stream may use channel f2 targeted for receiver N. In some embodiments, frequency diversity or MIMO capability may be supported in each RF channel of a wireless device with multi-channel full-duplex capability in accordance with the disclosure.

Code Division Multiple Access (CDMA) radios as implemented in 3rd and 4th generation cellular radio devices can use multiple CDMA channels to support higher information rates for both transmission and reception. However, the assigned CDMA channels reside within a single wideband RF channel. In contrast, a wireless device with multi-channel full-duplex capability in accordance with the disclosure may use two or more RF channels to convey independent information message streams.

Some commercially available smartphones are equipped with multiple transceiver units, one for cellular networks, one for WiFi networks, one for personal communication—such as Bluetooth®—and possibly one for near-field communication—such as Radio Frequency Identification (RFID). Even though such devices contain multiple modems or transceivers, each device is specifically designed as an integral part of a communication protocol stack: e.g., a 4G LTE modem for cellular network communication, a WiFi transceiver for hotspot and home networking, and so on. These are not identical, swappable modems nor is there any multiplexing of information messages.

The present disclosure describes a method where user data may be transmitted using more than one radio frequency (RF) communication channel to intended receivers, and where a single stack of link and network layer protocols may be used for data management and delivery. In one embodiment, a data frame processor and multiplexer may be used to connect input-output ports of the modems of a device with multi-channel full-duplex capability. The main functions of a data frame processor and multiplexer may include: 1) routing packets from an upper-layer processing block to one or more desired modem ports for transmission, and 2) collecting packets from modem ports and forwarding the packets to upper-layer processing blocks or rerouting the packets to another modem port. When operating as a relay in an ad hoc wireless network, a radio can retransmit link layer packets via the data frame processor and multiplexer, thus greatly reducing end-to-end delay. The data frame processor and multiplexer may allow relayed packets to be retransmitted more quickly without having to move up and down the protocol stack if these packets are tagged with a special flag. Routing efficiency may be improved by directly connecting with other neighbors in the ad hoc wireless network and forwarding data through the network.

In one embodiment, multiple modem cards may be combined with a data frame processor and multiplexer. The data frame processor and multiplexer may be configured to provide at least two functions. First, the data frame processor and multiplexer may distribute information data over parallel RF channels, thus allowing for load balancing and opportunistic communication (e.g., transmitting data in a channel with better radio propagation characteristics). Load balancing may refer to distributing workloads across multiple devices to more efficiently utilize resources such as bandwidth and throughput. Using multiple components with load balancing instead of a single component may increase reliability through redundancy. In some embodiments, multiple modem functionality may be provided on a single digital signal processing board.

Second, the data frame processor and multiplexer may allow routing across multiple communication channels. Without the use of a multi-channel full-duplex device, a data packet must be forwarded to a gateway radio to communicate across two different channels, adding hop count and delay during the process. With a multi-channel full-duplex device, gateways may be eliminated. Any multi-channel full-duplex device may therefore communicate directly with another multi-channel full-duplex device within communication range. This ability can also greatly reduce broadcast and multicast message overhead since a multi-channel full-duplex device can receive such messages on one channel while transmitting on another channel.

Figure 5:
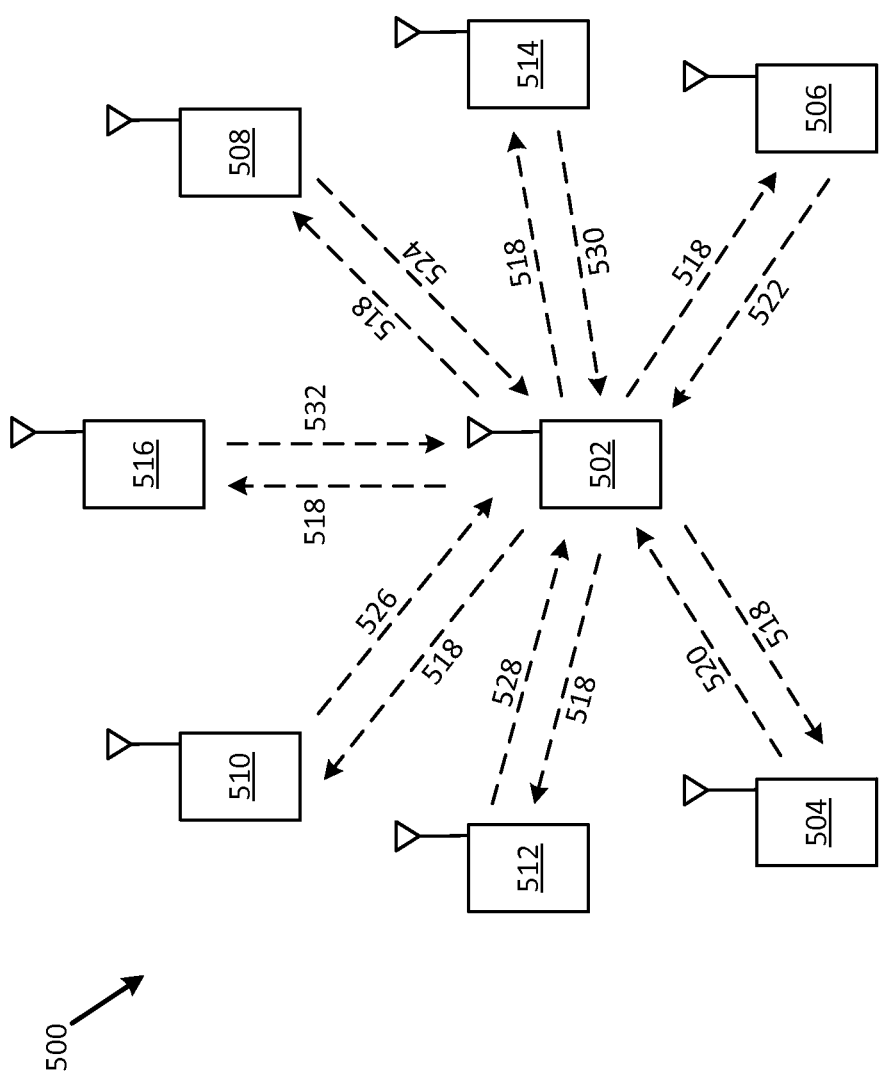
FIG. 5 depicts a schematic diagram of an example multi-channel, full-duplex, ad hoc wireless mesh network.

FIG. 5 depicts a schematic diagram of an example multi-channel, full-duplex, ad hoc wireless mesh network 500 including a first node 502, a second node 504, a third node 506, a fourth node 508, a fifth node 510, a sixth node 512, a seventh node 514, and an eighth node 516. Each of the nodes may comprise a radio. As used herein, the term "radio" may refer to any device capable of sending and/or receiving electronic data in the form of a signal, such as a transceiver or the like. In wireless mesh network 500, first node 502 transmits on a first radio frequency channel (hereinafter "channel") 518 and receives on a second channel 520, a third channel 522, a fourth channel 524, a fifth channel 526, a sixth channel 528, a seventh channel 530, and an eighth channel 532. All receptions and transmissions may occur simultaneously. That is, first node 502 is capable of communicating (e.g., transmitting and receiving) on multiple channels at once. Likewise, nodes 504, 506, 508, 510, 512, 514, and 516 may also be able to communicate on multiple channels at once.

Figure 6:
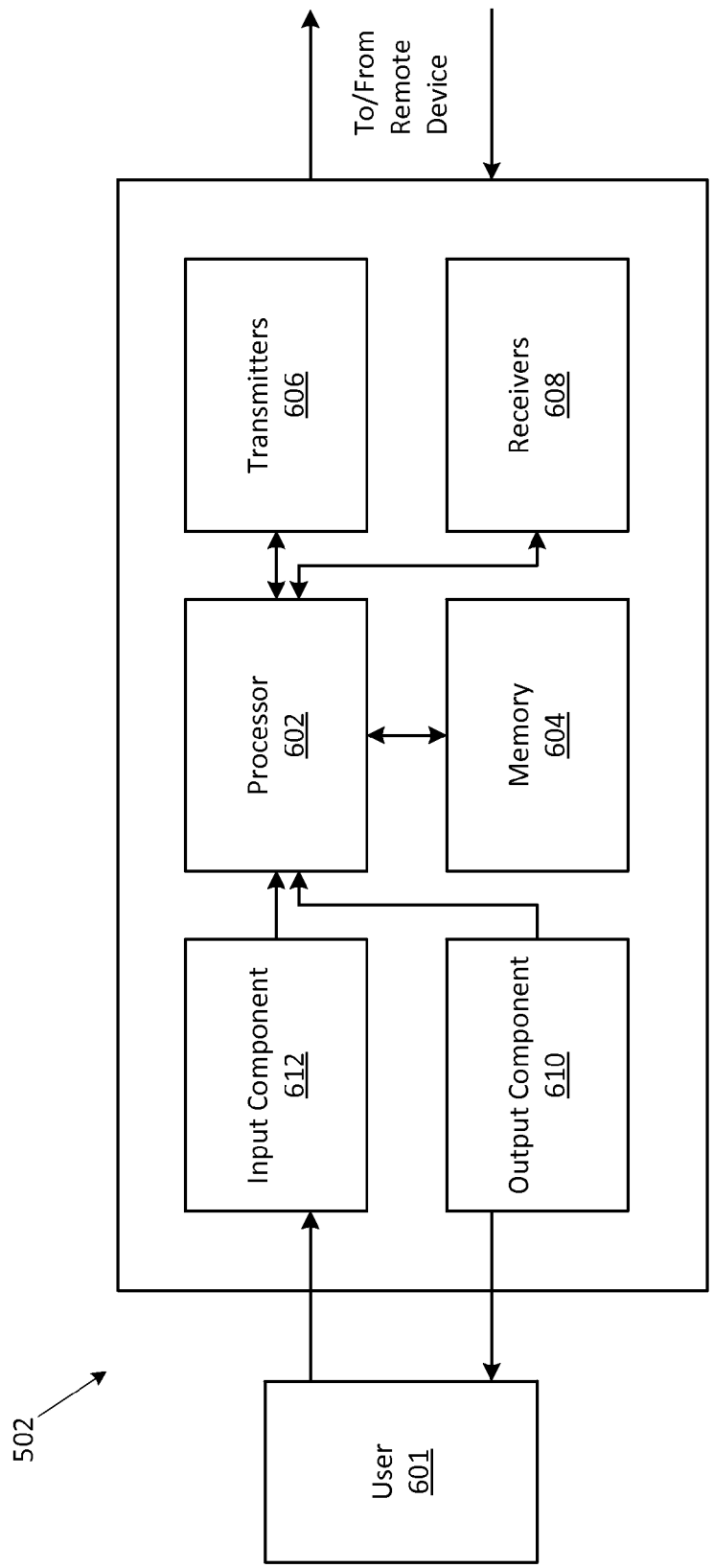
FIG. 6 is a schematic diagram of a node.

FIG. 6 is a schematic diagram of first node 502 of FIG. 5. Nodes 504, 506, 508, 510, 512, 514, and 516 may include similar components. In one embodiment, node 502 includes a processor 602, a memory device 604 coupled to processor 602, one or more wireless transmitters 606, one or more wireless receivers 608, an output component 610, and an input component 612.

Processor 602 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above example embodiments are not intended to limit in any way the definition and/or meaning of the term "processor."

Memory device 604 includes a non-transitory computer readable storage medium, such as, without limitation, random access memory (RAM), flash memory, a hard disk drive, a solid state drive, a diskette, a flash drive, a compact disc, a digital video disc, and/or any suitable memory. In the exemplary implementation, memory device 604 includes data and/or instructions embodying aspects of the disclosure that are executable by processor 602 (e.g., processor 602 may be programmed by the instructions) to enable processor 602 to perform the functions described herein. Additionally, the memory device 604 may comprise an operation system and applications Wireless transmitters 606 are configured to transmit control signals and data signals over wireless mesh network 500 (FIG. 5). In one embodiment, wireless transmitters 606 may transmit in a radio frequency spectrum and operate using a time-division multiple access (TDMA) communication protocol. Each wireless transmitter 606 transmits on a particular radio frequency channel. In other embodiments, one or more of wireless transmitters 606 are configured to transmit in a different frequency spectrum and/or communication protocol from others of the transmitters 606.

Wireless receivers 608 are configured to receive control signals and data signals over wireless mesh network 500. In one embodiment, wireless receivers 608 may receive signals on a radio frequency spectrum and operate using a TDMA communication protocol. Each wireless receiver 608 may receive signals on a particular radio frequency channel. In other embodiments, one or more of wireless receivers 608 may be configured to receive control signals and data signals on a different frequency spectrum and/or communication protocol from others of the receivers 608.

Node 502 may also include at least one output component 610 for presenting information to a user 601. Output component 610 may be any component capable of conveying information to user 601. In some implementations, output component 610 includes an output adapter such as a video adapter and/or an audio adapter or the like. An output adapter is operatively coupled to processor 602 and is configured to be operatively coupled to an output device such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with output component 610.

Node 502 includes at least one input component 612 for receiving input from user 601. Input component 612 may include, for example, a keyboard, a pointing device, a mouse, a stylus, a touch sensitive panel (e.g., a touch pad or a touch screen), a gyroscope, an accelerometer, a position detector, an audio input device, or the like. A single component such as a touch screen may function as both an output device of output component 610 and input component 612. In some implementations, output component 610 and/or input component 612 include an adapter for communicating data and/or instructions between node 502 and a computer connected thereto.

Figure 7:
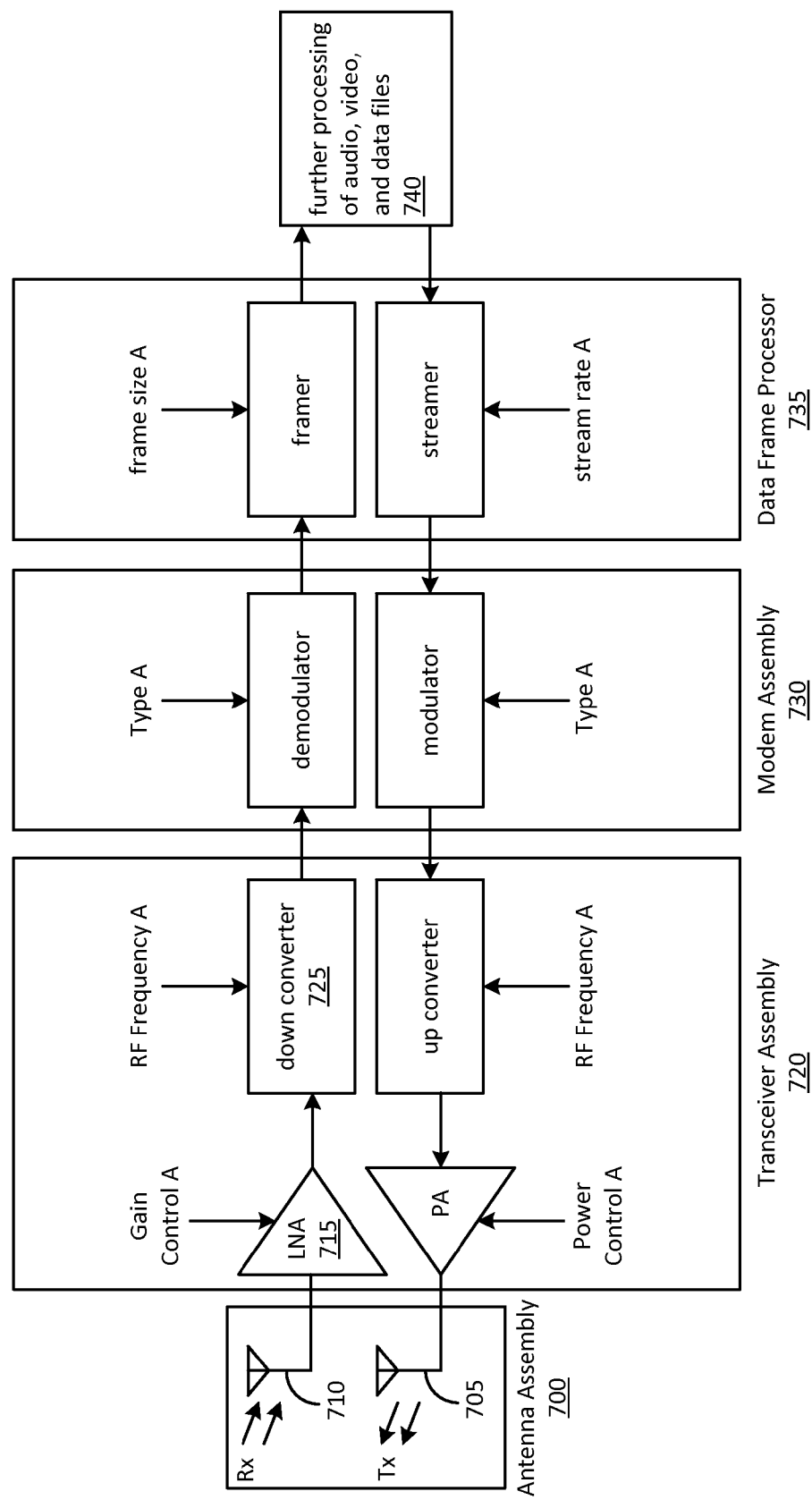
FIG. 7 depicts a conventional full-duplex wireless communication device.

FIG. 7 depicts a conventional full-duplex wireless communication device. FIG. 7 depicts an antenna assembly 700 including a transmitter element 705 and receiver element 710 in the antenna assembly 700. Signals received by the receiver element 710 may be amplified by a low noise amplifier (LNA) 715 that may be gain controlled in a transceiver assembly 720. The amplified signal may be converted by a down converter 725 and sent to a modem assembly 730 for demodulation. The demodulated signal may be sent to a data frame processor 735 to frame the data, which may then be sent to additional processes and applications 740 for processing of the data.

Figure 8:
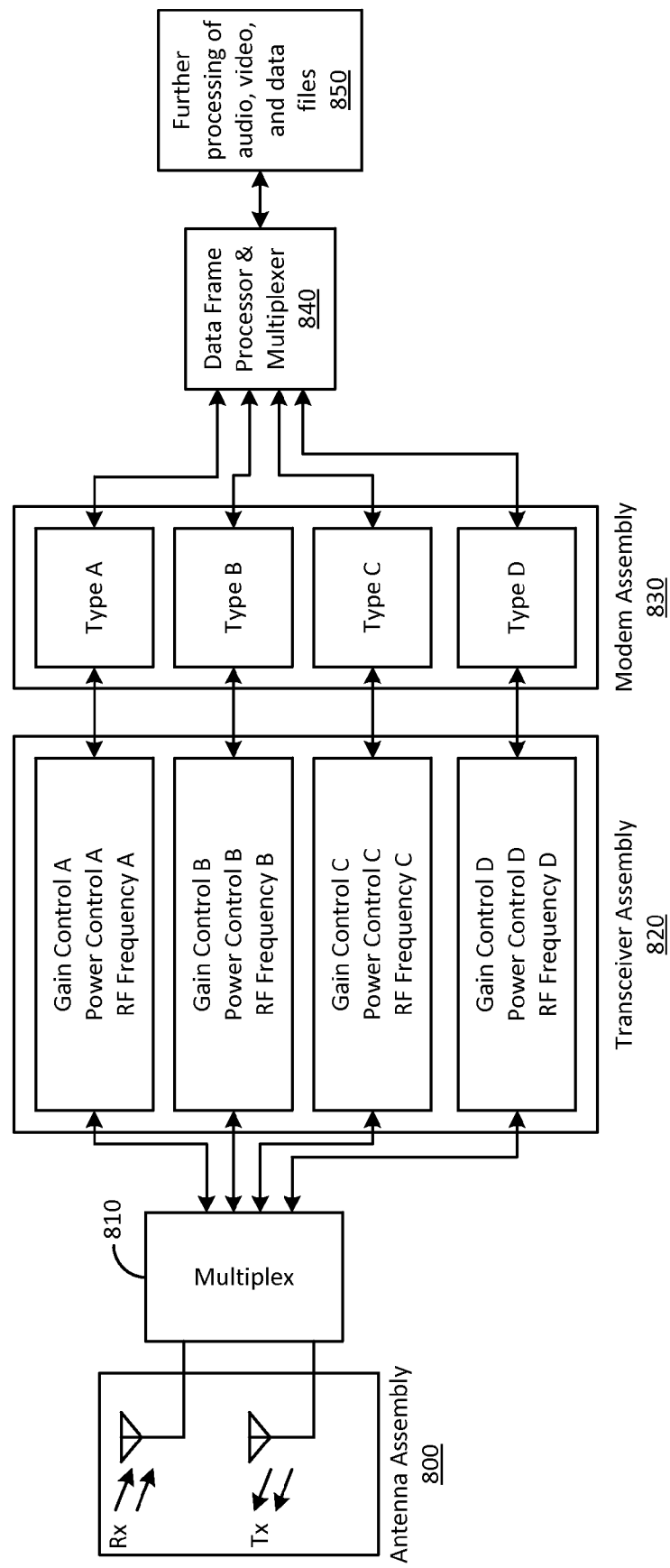
FIG. 8 depicts an embodiment of a four channel wireless communication device.

FIG. 8 depicts an embodiment of a four channel wireless communication device in accordance with the present disclosure. FIG. 8 includes an antenna assembly 800 including a transmitter element and receiver element in the antenna assembly 800. Signals received by the receiver element may be sent to a multiplexer subsystem 810 that multiplexes the received signals and sends the multiplexed signals to a transceiver assembly 820 that includes a plurality of transceiver elements that may each include an LNA that may be gain controlled (not shown). The amplified signal may be converted by a down converter in modem assembly 830 that includes a plurality of modems. The demodulated signal may be sent to a data frame processor/multiplexer 840 to frame and multiplex the data which may then be sent to additional processes and applications 850 for processing of the data. It should be understood that FIG. 8 depicts a wireless communication device that implements four channels for illustrative purposes only. Such a wireless communication device may have different numbers of channels in other embodiments.

Figure 9:
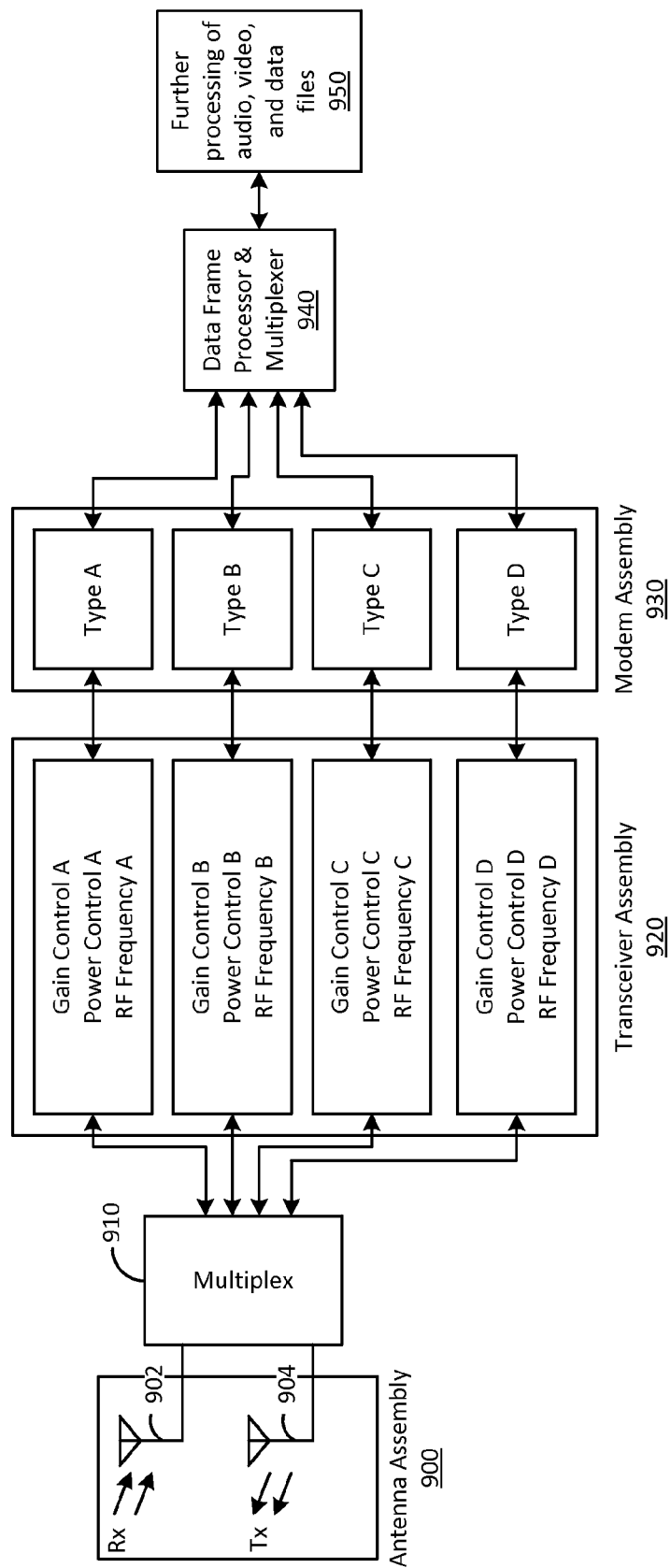
FIG. 9 depicts an embodiment of a four channel wireless communication device.

FIG. 9 depicts an embodiment of a four channel wireless communication device in accordance with the present disclosure, where one channel is used for transmission (Type A) and the remaining three channels are used for reception (Type B, C, and D). In some embodiments, each of the four channels can be used for transmission and reception. In still further embodiments, any number of the four channels can be used for both transmission and reception. FIG. 9 includes an antenna assembly 900, including a receiver element 902 in the antenna assembly 900. Signals received by the receiver element 902 may be sent to a multiplexer subsystem 910 that demultiplexes the received signals and sends the demultiplexed signals to a transceiver assembly 920 that includes a plurality of transceiver elements (not shown). Each of the transceiver elements may include a power amplifier that may be power controlled. The amplified signal may be converted by a down converter in a modem assembly 930 that includes a plurality of modems. The demodulated signal may be sent to a data frame processor/multiplexer 940 to frame and multiplex the data which may then be sent to additional processes and applications 950 for processing of the data. FIG. 9 also depicts antenna assembly 900 including a transmitter element 904 in the antenna assembly 900. Data received from processes and applications 950 that are to be transmitted may be sent to the data frame processor/multiplexer 940 to multiplex the data. The multiplexed data may be sent to the modem assembly 930 to modulate the data. The modulated data may be sent to the transceiver assembly 920 for amplification. The transceiver assembly 920 may include an LNA that may be gain controlled (not shown). The amplified signal may be sent to the multiplexer subsystem 910, which may multiplex the amplified signal for transmission by the transmission element 904 in antenna assembly 900.

Figure 10:
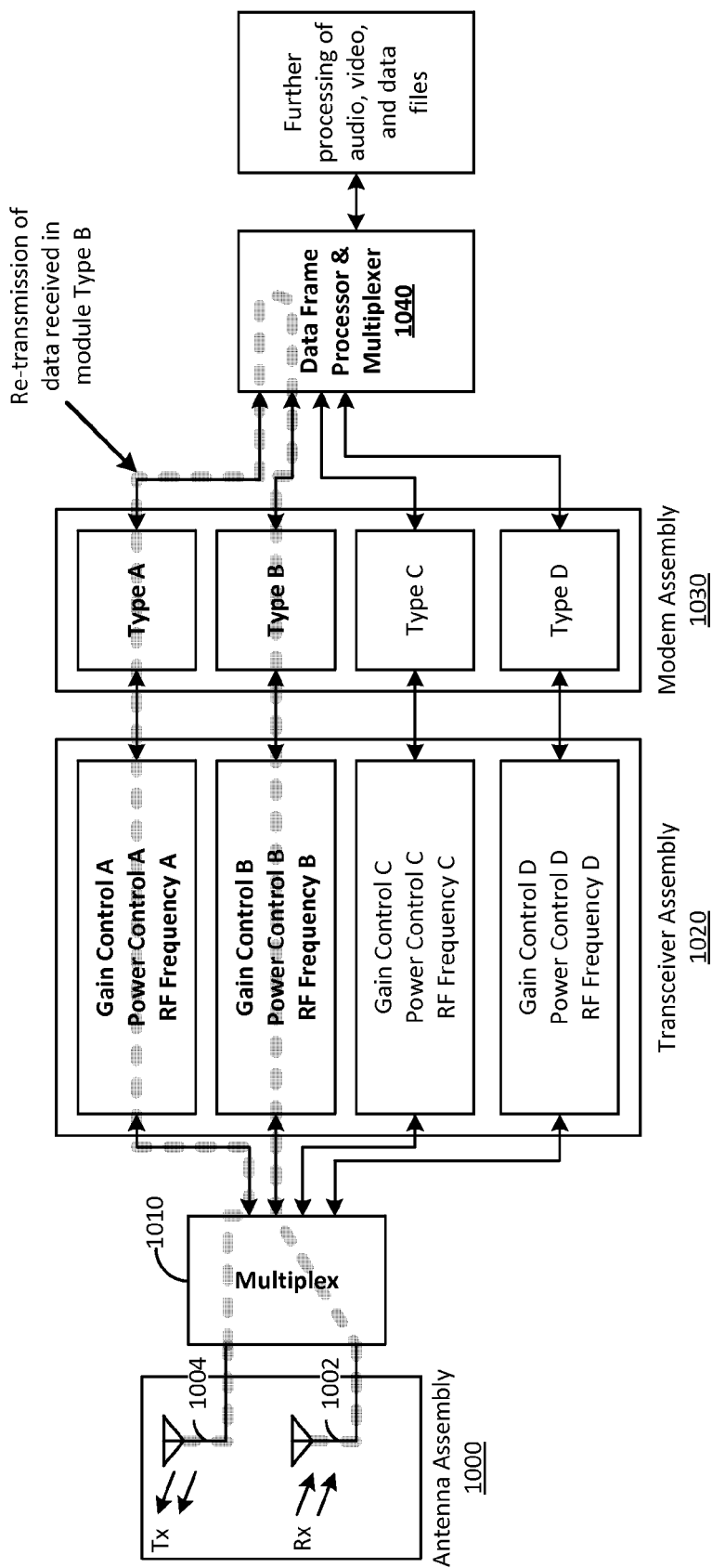
FIG. 10 depicts an embodiment of a four channel wireless communication device.

FIG. 10 depicts an embodiment of a four channel wireless communication device in accordance with the present disclosure, where one channel is used for transmission only (Type A), and the remaining three are used for reception only (Type B, C, and D) where the received data frame from the module Type B is retransmitted in module Type A (as directed by the data frame processor and multiplexer). As discussed above, in one embodiment, the four channel wireless communication device may operate as a relay in an ad hoc wireless network and retransmit link layer packets to other neighbors in the ad hoc wireless network. In an embodiment, the four channel wireless communication device may include a data frame processor and multiplexer that connects input-output ports of the modem assembly 1030. The data frame processor and multiplexer may allow relayed packets to be retransmitted more quickly without having to move up and down the protocol stack. By transmitting data received via module Type B, end-to-end delay may be reduced and routing efficiency may be improved. In some embodiments, each of the four channels can be used for transmission and reception. In still further embodiments, any number of the four channels can be used for both transmission and reception.

Referring to FIG. 10, FIG. 10 includes an antenna assembly 1000 including a receiver element 1002 in the antenna assembly 1000. Signals received by the receiver element 1002 may be sent to a multiplexer subsystem 1010 that demultiplexes the received signals and sends the demultiplexed signals to a transceiver assembly 1020 that includes a plurality of transceiver elements (not shown). Each of the transceiver elements may include a power amplifier that may be power controlled. The amplified signal may be converted by a down converter in a modem assembly 1030 that includes a plurality of modems. The demodulated signal may be sent to a data frame processor/multiplexer 1040. The data frame processor/multiplexer 1040 may read the demodulated data and determine that the data is addressed to a different destination node in the wireless network. The data frame processor/multiplexer 1040 may send the data back to the modem assembly 1030 to modulate the data. The modulated data may be sent to the transceiver assembly 1020 for amplification. The transceiver assembly 1020 may include an LNA that may be gain controlled (not shown). The amplified signal may be sent to the multiplexer subsystem 1010, which may multiplex the amplified signal for transmission by the transmission element 1004 in antenna assembly 1000.

Figure 11:
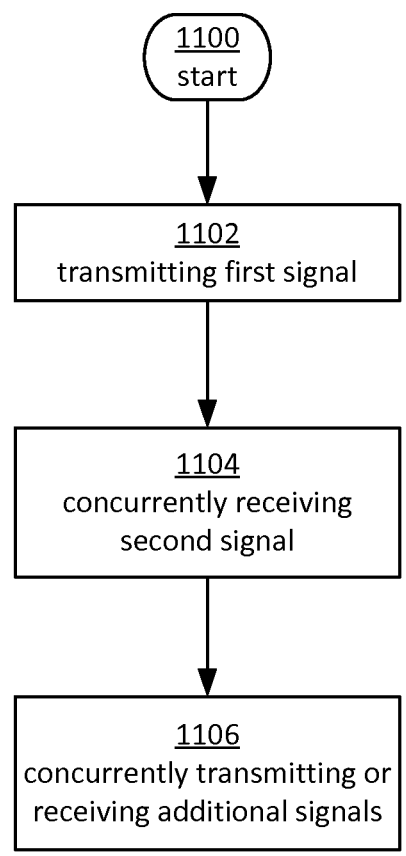
FIG. 11 illustrates an example operational procedure for communicating in an ad hoc wireless network by a wireless device.

FIG. 11 illustrates an example operational procedure for communicating in an ad hoc wireless network by a wireless device. In an embodiment, an ad hoc wireless network may correspond to ad hoc wireless network 100 in FIG. 1 or ad hoc wireless network 500 in FIG. 5.

Referring to FIG. 11, operation 1100 begins the operational procedure. Operation 1100 may be followed by operation 1102. Operation 1102 illustrates transmitting, on a first radio frequency (RF) channel of the wireless network, a first signal by at least a first radio of the wireless device. In one embodiment, the first signal is encoded using at least a first modem of the wireless device. Operation 1102 may be followed by operation 1104. Operation 1104 illustrates concurrently receiving, on a second RF channel of the wireless network, a second signal by at least a second radio of the wireless device. In one embodiment, the second signal is encoded or decoded using at least a second modem of the wireless device. In some embodiments, multiple modem functionality can be encompassed in a single modem digital signal processing board, enabling a single modem to encode or decode a plurality of channels.

Operation 1104 may be followed by operation 1106. Operation 1106 illustrates concurrently transmitting or receiving, on additional RF channels of the wireless network, additional signals by additional radios of the wireless device. In one embodiment, the additional signals are encoded or decoded using additional modems of the wireless device.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

While certain example or illustrative embodiments have been described, these embodiments have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

The invention claimed is:

1. A method of communicating in an ad hoc wireless network by a wireless device, the method comprising:
   transmitting or receiving, on a first radio frequency (RF) channel of the wireless network, a first signal by at least a first radio of the wireless device, the first signal encoded using a modem assembly of the wireless device;
   concurrently transmitting or receiving, on a second RF channel of the wireless network, a second signal by at least a second radio of the wireless device, the second signal encoded using the modem assembly of the wireless device;
   concurrently transmitting or receiving, on a third RF channel of the wireless network, a third signal by at least a third radio of the wireless device, the third signal encoded or decoded using the modem assembly of the wireless device; and
   determining that one of the first, second, or third signals is addressed to another wireless device communicating on the ad hoc wireless network, and in response to the determining, retransmitting the signal addressed to the other wireless device back to the ad hoc wireless network via a different radio other than the radio that received the signal addressed to the other wireless device; wherein the first signal is indicative of a retransmission of a link layer packet received on the second RF channel and transmitted using a data frame processor and multiplexer and wherein the link layer packet is transmitted without moving up or down a protocol stack by tagging the link layer packet.

2. The method of claim 1, wherein said first signal comprises at least a received signal from a peer wireless device in the ad hoc wireless network.

3. The method of claim 1, wherein the wireless device executes a single networking protocol stack.

4. The method of claim 1, wherein the wireless device includes a data frame processor and multiplexer communicatively coupling input/output ports of the modem assembly.

5. The method of claim 4, wherein the data frame processor and multiplexer is configured to balance loads across the first, second and third RF channels.

6. The method of claim 1, further comprising concurrently transmitting or receiving, on additional RF channels of the wireless network, additional signals by additional radios of the wireless device, the additional signals encoded or decoded using additional modems of the wireless device.

7. The method of claim 1, wherein the first, second and third RF channels are non-overlapping and the first, second and third signals are indicative of independent information message streams received from or transmitted to different devices communicatively coupled to the ad hoc wireless network.

8. The method of claim 1, wherein the first, second and third channels are configured to support frequency diversity transmission methods.

9. The method of claim 1, wherein the modem assembly comprises at least a first modem associated with the first RF channel, a second modem associated with the second RF channel, and a third modem associated with the third RF channel.

10. A mobile communications device configured to communicate in a peer-to-peer wireless network, the mobile communications device comprising:
    a first radio configured to transmit or receive over at least a first channel in the peer-to-peer wireless network;
    a second radio configured to transmit or receive over at least a second channel in the peer-to-peer wireless network, the second channel non-overlapping with the first channel;
    wherein the mobile communications device is configured to:
    transmit or receive, via the first radio, a first signal on the first channel;
    concurrently transmit or receive, via the second radio, a second signal on the second channel; and
    determine that a signal received on the first radio is addressed to another mobile communications device communicating on the peer-to-peer wireless network, and in response to the determination, retransmit the signal back to the peer-to-peer wireless network via the second radio; wherein the first signal is indicative of a retransmission of a link layer packet received on the second channel, wherein the link layer packet is transmitted without moving up or down a protocol stack by tagging the link layer packet.

11. The mobile communications device of claim 10, further comprising a first modem configured to encode or decode the first signal and a second modem configured to encode or decode the second signal.

12. The mobile communications device of claim 11, further comprising a data frame processor and multiplexer communicatively coupling input/output ports of the first and second modems.

13. The mobile communications device of claim 10, wherein the first signal comprises a retransmission of data received on the second channel, the second signal received from a first peer in the peer-to-peer wireless network and the first signal sent to a second peer in the peer-to-peer wireless network.

14. The mobile communications device of claim 10, further comprising additional radios configured to transmit or receive on respective additional channels in the peer-to-peer wireless network.

15. The mobile communications device of claim 14, wherein the additional radios comprise at least a third radio, wherein the mobile communications device is configured to retransmit, using the third radio, data received on the first or second channel, the first or second signal received from a peer in the peer-to-peer wireless network and the retransmitted data sent to another peer in the peer-to-peer wireless network.

16. A non-transitory computer-readable medium having computer-readable instructions stored thereon, the computer-readable instructions comprising instructions that upon execution on a computing system, at least cause:

receiving, via a first modem of a mobile computing device, a first signal on a first channel of a wireless communication network;
concurrently receiving, via a second modem of the mobile computing device, a second signal on a second channel of the wireless communication network; and
determining that one of the first or second signals is addressed to another mobile computing device communicating on the wireless communication network, and in response to the determining, retransmitting the signal addressed to the other computing device back to the wireless communication network via a different modem other than the modem that received the signal addressed to the other mobile computing device; wherein the first signal is indicative of a retransmission of a link layer packet received on the second channel and wherein the link layer packet is tagged to avoid moving up or down a protocol stack during the retransmission.

17. The non-transitory computer-readable medium of claim 16, further comprising computer-readable instructions comprising instructions that upon execution on a computing system, at least cause:

concurrently transmitting or receiving, on additional channels of the wireless communication network, additional respective signals by additional respective radios of the mobile computing device.

18. The non-transitory computer-readable medium of claim 16, further comprising computer-readable instructions comprising instructions that upon execution on a computing system, at least cause:

retransmitting, using a third channel of the wireless communication network, data received on the first channel of the wireless communication network, the data received from a first peer mobile computing device communicatively coupled via the wireless communication network and the retransmitted data sent to a second peer mobile computing device communicatively coupled via the wireless communication network.

19. The non-transitory computer-readable medium of claim 16, wherein the first signal is decoded using the first modem and the second signal is decoded using the second modem.

20. The non-transitory computer-readable medium of claim 16, further comprising computer-readable instructions for instantiating a single networking protocol stack for implementing a computer networking protocol suite.

* * * * *